United States Patent Office 3,109,433
Patented Nov. 5, 1963

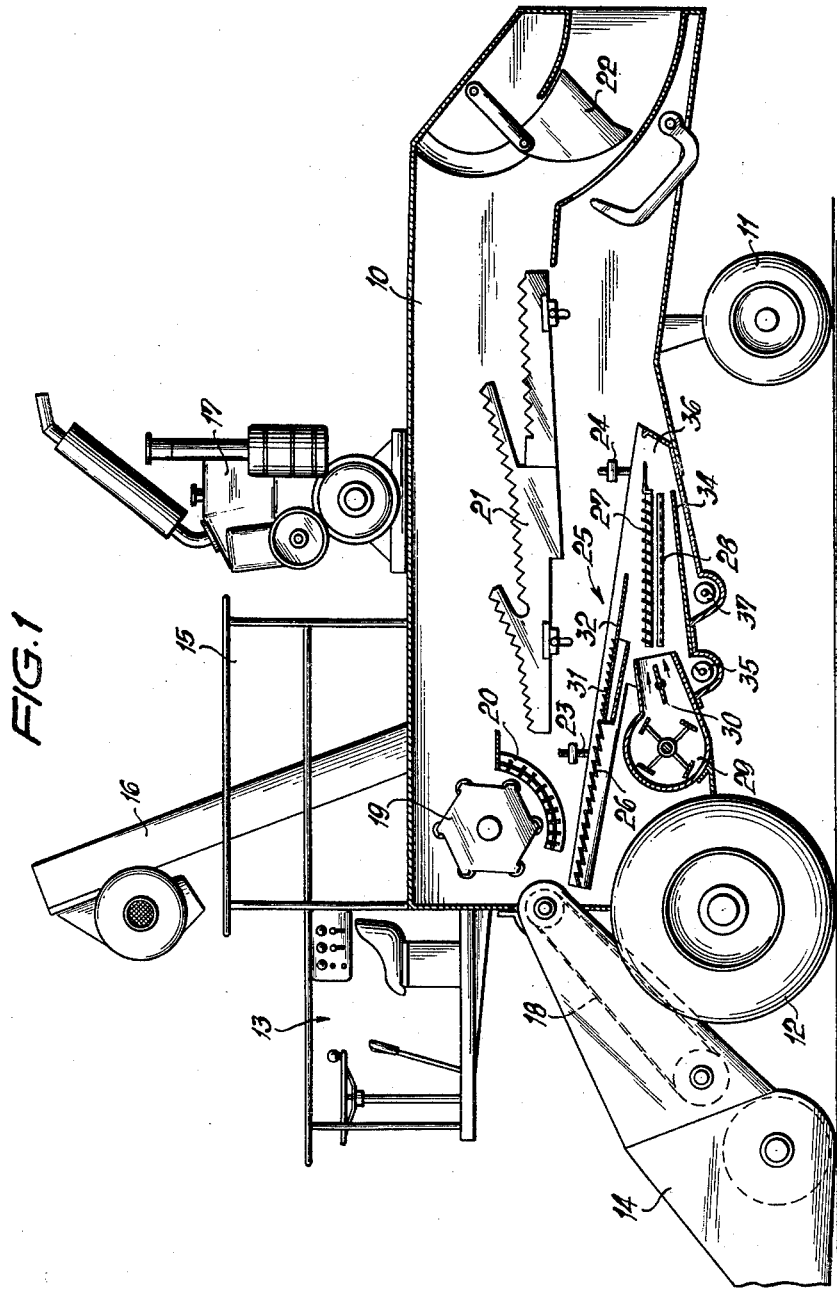

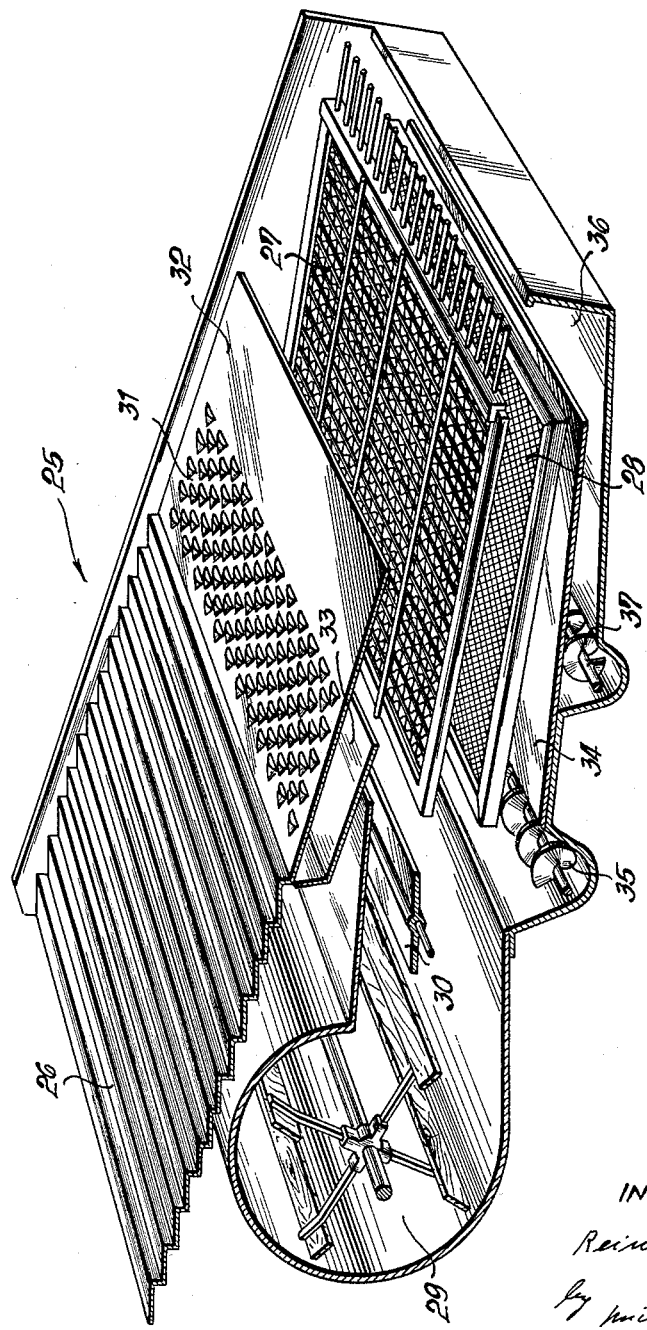

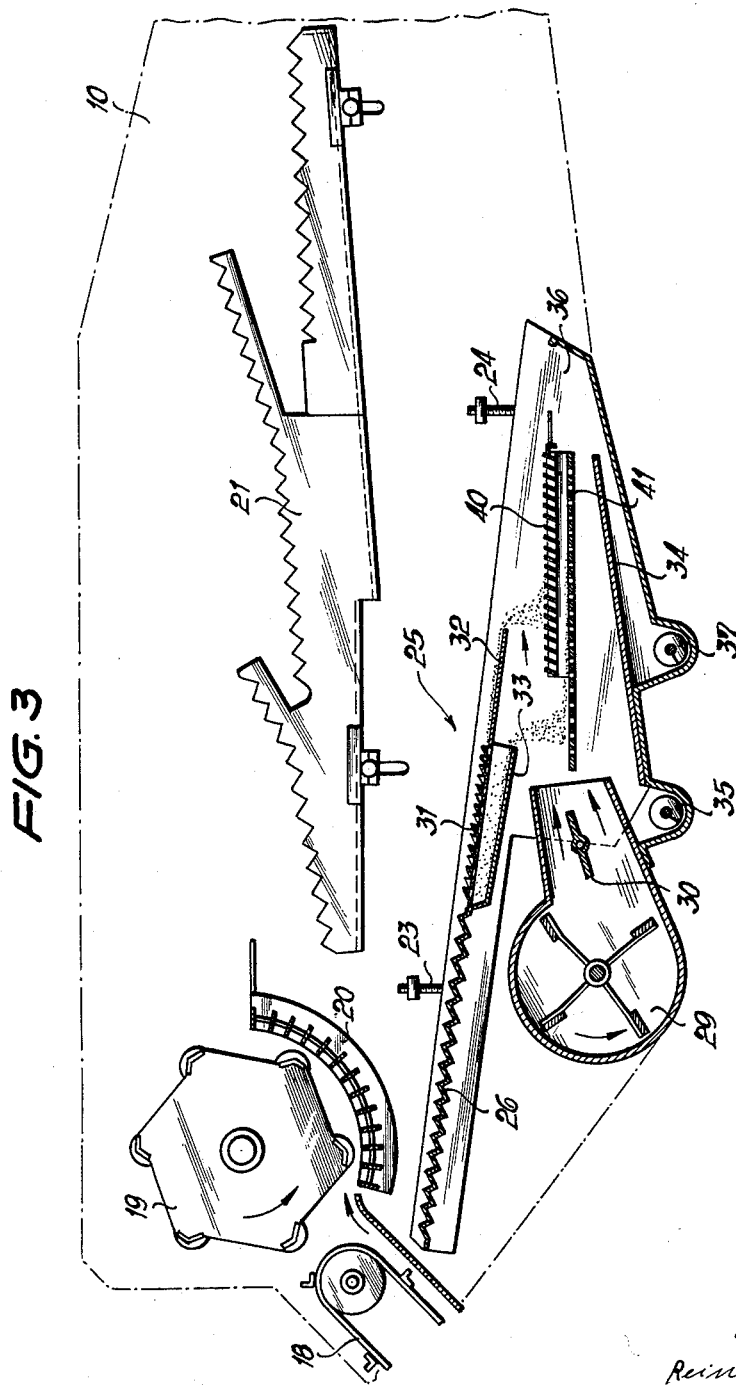

3,109,433
THRESHING MECHANISM, PARTICULARLY FOR COMBINE HARVESTERS
Reinhold Claas, 64, August-Claas-Strasse, Harsewinkel, Westphalia, Germany
Filed July 28, 1961, Ser. No. 127,730
Claims priority, application Germany Oct. 25, 1960
3 Claims. (Cl. 130—24)

This invention relates to threshing mechanisms, and more specifically to a threshing mechanism, particularly for combine harvesters, with a cleaning and dressing device including a shaking grain board for conveying threshed material to a dressing shoe containing a set of shaking sieves.

In the known mechanisms of this specific kind the lower end of an inclined shaking grain board is provided with perforations below which is a collecting board for delivering the material which drops through the perforations to the forward end of a set of sieves. An air blast is conducted through the space between the perforated lower end of the grain board and the collecting board and is deflected by shutters against the underside of the perforated lower end of the grain board. The perforated lower end of the grain board projects over the set of sieves which therefore receive both the material which has dropped through the perforations and the material which is discharged over the lower edge of the grain board. The threshings are thus first separated and then reassembled on the same part of the set of sieves. This may cause the sieves to be choked and the functional efficiency of the machine to be impaired.

In another known type of combine harvesters a cleaning mechanism is provided which comprises an oscillatable grain board one end of which forms a screen that extends across the entire length of the set of sieves and thus constitutes the top sieve thereof. Also in this form of construction the distribution of the material across the sieve areas is very irregular, a circumstance which likewise reduces the operational reliability and efficiency of the machine. Substantially the dressing means in the known types of combine harvesters have in the past been constructed in such a way that all the threshed material is conveyed by the oscillatory grain board, which might be described as a preparatory board because it not only conveys but also loosens up the material, to the top sieve in the dressing shoe. The disadvantages which are inherent in an irregular distribution of the material across the sieve surfaces have in the past been accepted as such and, in order to achieve a satisfactory working efficiency, the sieve areas have simply been made sufficiently large. Naturally this is a waste of valuable space, apart from involving an increase in the weight of machine parts and of the power needed to drive them, without at the same time ensuring that chocking of the sieves cannot occur. Known forms of construction have not therefore been able to give full satisfaction.

The object envisaged by the present invention is the provision of a threshing mechanism of the above-specified kind, particularly for use in combine harvesters, which is reliable and efficient in operation even under considerably varying working conditions, and which is also of compact construction and of minimum overall size.

In a threshing mechanism of the specified kind with a cleaning and dressing device the invention therefore provides a shaking grain board for conveying threshed material to a dressing shoe containing a set of shaking sieves, said shaking grain board comprising a portion provided with perforations through which some of the threshed material can drop for deposition on only part of the surfaces of the set of sieves, whereas an unbroken delivery portion of said shaking grain board follows said perforated portion in the direction of feed of the threshed material and extends partly over said set of sieves to deposit remaining material on a more rearwardly located part of the surfaces of said set of sieves.

In this proposed form of construction the perforated portion of the shaking grain board in conjunction with the unbroken delivery portion thereof has the effect of dividing the stream of material into two streams which drop onto two different and relatively spaced consecutive parts of the sieves of the dressing shoe. The material is therefore more evenly spread over the entire sieve surface with a resultant improvement in the operational reliability and efficiency of the sieves. Experience has shown that the proposed construction of the cleaning and dressing device in the threshing machine ensures satisfactory operation even in adverse conditions of feed, although the material which is conveyed to the delivery end of the grain board is deposited on only part of the surfaces of the sieves of the dressing shoe. This satisfactory result is attributable to the fact that the perforated portion of the shaking grain board acts as a screen which separates most of the grain and chaff from the main stream of material and that this is cleaned by passing through the forward part of the sieves where choking of the mesh of the sieves is therefore unlikely, whereas the remaining coarser material containing only a small amount of grain continues to travel along the grain board to be more thoroughly loosened up before it drops onto a more rearward part of the sieves for an efficient removal therefrom of the remaining grain even though the available sieve surface is only part of the full surface area of the sieves.

The basic idea which underlies the invention can be embodied in various ways. In a preferred form of construction the perforated portion of the shaking grain board, located between an unbroken entry portion and the unbroken delivery portion extending partly over the set of sieves, is constructed in the manner of a nose-slot screen, that is to say of a screen with openings which are shielded by arching hood-like embossments in the grain board material on the sides of the perforations facing the entry end of the grain board. These embossments prevent elongated pieces of straw and so forth from being included in the material which drops through the perforated portion of the grain board.

The exact position of the perforated portion of the grain board is a matter of choice. In a useful form of construction said perforated portion may be situated on the upstream side of the set of sieves of the dressing shoe and the material dropping therethrough may be intercepted by a special collecting board which is arranged below the perforated portion and conducts this material to that part of the sieve surface which is located at the forward end of the set of sieves. This form of construction provides a particularly efficient utilization of space, apart from the fact that the material which drops through the perforated portion of the grain board, and which contains the greater proportion of grain, reaches the sieves in a compact stream, permitting the sieve area below the unbroken delivery portion of the grain board to be used with the maximum possible degree of efficiency.

If the dressing shoe contains a plurality of sieves and no less than two, the efficiency of the dresser can be further improved if the material which drops through the perforated portion of the shaking grain board is directly deposited on the bottom sieve and does not first pass through the uppermost sieve or sieves, respectively. Experience has shown that such an arrangement, especially if the perforated portion of the shaking grain board is appropriately designed and located, further improves the efficiency of the dressing shoe, and that the sieve area can be reduced to a minimum. When the set of sieves is composed of a bottom sieve and a top sieve, the desired effect can be easily achieved if the forward end of the top sieve is set back in relation to the forward end of the bottom sieve.

According to another feature of the invention the efficiency of the device can be still further improved if the unbroken delivery portion of the collecting board is located at a suitable height above the set of sieves, so that the material which has already passed through the perforated portion of the shaking grain board is forced to drop in free fall through a region where it is exposed to the blast of a fan which is arranged in front of the set of sieves and blows away cavings and chaff before these can reach the sieves.

The risk of the set of sieves being choked by material can be further reduced by the location of the unbroken delivery portion of the shaking grain board above the set of sieves in the dressing shoe, where this portion of the shaking grain board will act as a roof for the interception of any material which might otherwise drop from the shaker directly on to the set of sieves. More particularly, long pieces of straw falling head foremost cannot thus drop on to the set of sieves and become lodged in the openings thereof. Conveniently the unbroken delivery portion following the perforated portion of the shaking grain board in the direction of feed may be located below the delivery end of the shaker, the return board from the shaker being disposed to deliver the material on to the unbroken portion of the shaking grain board which in the direction of feed precedes the perforated portion of the shaking grain board.

Two preferred embodiments of the invention will now be described by way of example and with reference to the accompanying drawing in which:

FIG. 1 is a schematic side elevational view, partly in section, of a combine harvester with a shaking grain board and a dressing shoe;

FIG. 2 is a fragmentary perspective view of the grain board and the dressing shoe of the combine harvester shown in FIG. 1 but drawn to an enlarged scale; and FIG. 3 is a fragmentary elevational section showing a modified form of the invention on an enlarged scale.

In FIGS. 1 and 2 a self-propelled combine harvester is represented which comprises a box-like frame 10 mounted on wheels 11 and 12. In a conventional manner the forward end of the combine harvester is provided with a driver's seat 13. Moreover, the machine is fitted with an elevationally adjustable cutter platform 14, the cutter being optionally replaceable by pick-up means. Mounted on the frame 10 is a bagging stand 15, the grain being conveyed to the same by an elevator 16. The frame 10 also carries a driving engine 17. The crop which falls on to the cutter platform 14 is conveyed by an elevator 18 to threshing means comprising a drum 19 and a concave 20. The straw leaving the threshing means and which may still contain grain, passes on to a shaker 21 and may be compressed into bales by a straw baling ram 22 after having left the shaker 21. Below the concave 20 is a shaking box 25 suspended from hangers 23 and 24, the forward end of said box 25 being formed by an unbroken entry portion 26 of a shaking grain board. A set of sieves is contained in the box 25. In a conventional manner said set of sieves may comprise a top sieve 27 and a bottom sieve 28. Generally the top sieve 27 is of the louvre type and adjustable, whereas the bottom sieve 28 is an exchangeable sieve for substitution by another according to the nature of the threshed crop. The frame 10 of the combine harvester is further equipped with a fan 29 with an associated shutter 30 for controlling the direction of the blast. The unbroken portion 26 of the grain board which in a conventional manner may have a serrated cross-section merges, as is shown in FIG. 2, into a portion 31 which is provided with perforations, preferably in the form of a nose-slot screen. In screens of this type the openings in the screen are covered by embossed arched sections of material on their upstream side so that despite the relatively large openings only small particles such as grain and small pieces of chaff can pass such screens. Also the arched embossments prevent the openings from being choked by larger particles. The perforated portion 31 of the shaking grain board is further extended in the direction of travel of the material by an unbroken delivery portion 32 which overhangs the entry end of the set of sieves comprising the top sieve and the bottom sieve. Below the perforated portion 31 is a collecting board 33 for catching everything that drops through the perforated portion 31 of the grain board. This collecting board 33 extends beyond the forward end of the sieves 27 and 28 where it delivers the chaff and grain which has dropped through the perforated portion 31. The delivery edge of the collecting board 33 is located well above the top sieve 27 so that the material is forced to drop in free fall through a region in which it is exposed to the blast from the fan before reaching the top sieve 27. The material which travels across the perforated portion 31 and the unbroken delivery portion 32 of the shaking grain board without having fallen through the perforations in the portion 31 is deposited on a central area of the set of sieves. It is preferred to locate the free end of the unbroken delivery portion 32 of the shaking grain board so that about ⅔ of the length of the top sieve 27 are available for the reception of the dropping material. The delivery end of the shaking grain board is at a suitable height above the top sieve 27 to provide a drop sufficient for the light particles of the falling material to be exposed to the blast of the fan before reaching the top sieve. The grain which has dropped through both sieves 27 and 28 is conveyed in a conventional manner by a return pan 34 to a grain auger 35 which feeds it to the afore-mentioned elevator 16. The material retained by the sieves, particularly cavings, chaff, awns and so forth, which have not been carried away by the blast fall into a trough 36 below the delivery ends of the sieves 27 and 28, whence they are returned by an auger 37 to the threshing device as a back feed. Moreover, the arrangement is preferably such that the delivery end of the shaker 21 is located above the unbroken delivery portion 32 of the oscillatable board, thus preventing longer pieces of straw from falling head foremost directly into the openings of the sieves 27 and 28.

The general arrangement illustrated in FIG. 3 roughly corresponds with that shown in FIGS. 1 and 2. In other words, the threshing device likewise comprises a drum 19, a concave 20 and a shaking box 25 suspended below the concave from hangers 23 and 24 and containing a shaking grain board with an unbroken entry portion 26 merging into a perforated portion 31 followed by an unbroken delivery portion 32. Below the perforated portion 31 is a collecting board 33 similar to that shown in FIGS. 1 and 2. The delivery end of the shaker 21 in this embodiment is likewise preferably located above the unbroken entry portion 26 of the shaking grain board. However, the arrangement of the dressing shoe comprising a top sieve 40 and a bottom sieve 41 differs from that in FIGS. 1 and 2 in that the top sieve 40 is shorter than the bottom sieve 41, the forward end of the top sieve 40 lying behind that of the bottom sieve 41 in such a manner that the material which falls from the end of the collecting board 33 is directly deposited on the bottom sieve 41 and thus further relieves the top sieve 40 of some of the work. In this arrangement practically only that portion of the threshings is deposited on the top sieve 40 which has failed to drop through the openings in the perforated portion 31 of the shaking grain board.

The above-described embodiments of the invention are understood to be merely illustrative and are not intended to limit its scope. Other modifications of the invention are feasible. The dimensions of the several parts and the details of their construction are capable of variation in several respects. Also, the invention can be applied to harvester threshers or threshing machines which differ from the combine harvester illustrated in FIG. 1. The manner in which the functional parts of the machine are driven and mounted may accord with conventional practice.

I claim:

1. A cleaning and dressing arrangement for a threshing mechanism comprising, in combination, a shaking grain board for receiving and conveying threshed material in one direction and having a perforated portion through which part of the threshed material may drop and an unbroken delivery portion following said perforated portion in said one direction and having a rear delivery edge; a collecting board located beneath said perforated portion of said shaking grain board for receiving the material passing through said perforated portion and for feeding the same in said one direction, said collecting board having a rear delivery edge located forwardly of said rear delivery edge of said shaking grain board; a top sieve having a front portion located below said rear delivery edge of said shaking grain board and rearwardly spaced from said delivery edge of said collecting board so that the threshed material which has not passed through said perforated portion of said shaking grain board is delivered over said unbroken delivery portion thereof onto said front portion of said top sieve; and a bottom sieve located below said top sieve and having a front portion located forwardly of said front portion of said top sieve and below said delivery edge of said collecting board for receiving from the latter the part of the threshed material which has dropped through said perforated portion of said shaking board.

2. A cleaning and dressing arrangement for a threshing mechanism, comprising, in combination, a shaking grain board for receiving and conveying threshed material in one direction and having a perforated portion through which part of the threshed material may drop and an unbroken delivery portion following said perforated portion in said one direction and having a rear delivery edge; a set of shaking sieves arranged at least partly superimposed upon each other and located below said shaking grain board and having a front portion and said unbroken portion of said grain board extending beyond and covering said front portion of said set of sieves so that the material passing over said unbroken portion of said grain board will be delivered to portions of said set of sieves located rearwardly of said front portion thereof; and a collecting board located beneath said perforated portion of said shaking grain board for receiving the material passing through said perforated portion and for feeding the same in said one direction, said collecting board having a rear delivery edge located forwardly of said rear delivery edge of said shaking grain board and above said front portion of said set of sieves for delivering onto said front portion the material which has passed through said perforated portion of said shaking board.

3. An arrangement as defined in claim 2 and including a fan arranged in front of said set of sieves and in which said collecting board is located at a suitable height above said set of sieves, so that the material passing from said collecting board onto said front portion of said set of sieves will freely fall through a region where it is exposed to the blast of the fan.

References Cited in the file of this patent

UNITED STATES PATENTS

| | | |
|---|---|---|
| 727,358 | Heieren | May 5, 1903 |
| 740,575 | Kramer | Oct. 6, 1903 |
| 765,701 | Cooper | July 26, 1904 |
| 1,180,703 | Detwieler | Apr. 25, 1916 |
| 2,661,005 | Peters | Dec. 1, 1953 |